United States Patent
Spindler et al.

(10) Patent No.: US 6,852,351 B2
(45) Date of Patent: *Feb. 8, 2005

(54) AERATED COMPOSITIONS AND PROCESS FOR ACHIEVING SUCH AERATED COMPOSITIONS

(75) Inventors: Suzanne Mary Spindler, Bedford (GB); Loyd Wix, Bedford (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/005,677

(22) Filed: Dec. 5, 2001

(65) Prior Publication Data

US 2002/0102343 A1 Aug. 1, 2002

(30) Foreign Application Priority Data

Dec. 6, 2000 (EP) .............................................. 00310835

(51) Int. Cl.⁷ ................................................. A23G 3/00
(52) U.S. Cl. ...................... 426/565; 426/566; 426/516; 426/522; 426/524
(58) Field of Search ................................ 426/565, 566, 426/516, 522, 524; 62/342

(56) References Cited

U.S. PATENT DOCUMENTS

| | | | |
|---|---|---|---|
| 2,576,995 A | 12/1951 | Carvel | |
| 3,145,017 A | 8/1964 | Thomas | |
| 4,162,127 A | 7/1979 | Wakeman et al. | |
| 4,400,406 A | 8/1983 | Morley et al. | |
| 4,421,778 A | 12/1983 | Kahn et al. | |
| 4,434,186 A * | 2/1984 | Desia et al. | 426/565 |
| 4,552,773 A | 11/1985 | Kahn et al. | |
| 4,798,734 A | 1/1989 | Kaneda | |
| 4,853,243 A * | 8/1989 | Kahn et al. | 426/564 |
| 5,473,909 A | 12/1995 | Burns et al. | |
| 5,919,510 A | 7/1999 | Fayard et al. | |
| 5,968,582 A | 10/1999 | Vaghela et al. | |
| 6,082,120 A | 7/2000 | Hoffmann et al. | |
| 6,613,374 B1 * | 9/2003 | Fayard et al. | 426/565 |
| 6,635,300 B2 * | 10/2003 | Adolphi et al. | 426/565 |

FOREIGN PATENT DOCUMENTS

| | | |
|---|---|---|
| DE | 89 08 631 | 11/1989 |
| DE | 197 50 677 | 6/1999 |
| EP | 0 191 487 A | 8/1988 |
| EP | 0 332 287 | 9/1989 |
| EP | 0 559 316 | 9/1993 |
| FR | 2 745 153 A | 8/1997 |
| GB | 371 406 | 4/1932 |
| GB | 530 180 | 12/1940 |
| GB | 538 187 | 7/1941 |
| GB | 2 019 187 A | 10/1979 |
| JP | 57 063053 | 4/1982 |
| JP | 57 068742 | 4/1982 |
| JP | 57 036943 | 2/2002 |
| WO | 00/70961 | 11/2002 |

OTHER PUBLICATIONS

European Search Report on EP 01 30 9242 dated Nov. 6, 2003.
Turkish Search Report on Application No. 2001/03524.
European Search Report on EP 01 30 9242 dated Oct. 30, 2003.
European Search Report on EP 00 31 0834 mailed May 21, 2001.
European Search Report on EP 01 30 9241 dated Mar. 5, 2002.
European Search Report dated Jul. 6, 2001.

* cited by examiner

*Primary Examiner*—N. Bhat
(74) *Attorney, Agent, or Firm*—Gerard J. McGowan, Jr.

(57) ABSTRACT

The present invention provides a cold extruded composition with at least 90% overrun, wherein said composition comprises a fat phase which has a high ratio of liquid fat to solid fat at the processing temperature. The present invention also relates to a process for the production of such compositions wherein a mix is aerated in an internal volume of a freezer barrel with a aerating means which has a low displacement of said internal volume, prior to cold extrusion.

5 Claims, No Drawings

AERATED COMPOSITIONS AND PROCESS FOR ACHIEVING SUCH AERATED COMPOSITIONS

TECHNICAL FIELD OF THE INVENTION

The invention relates to aerated food compositions. More particularly the invention relates to aerated ice cream compositions which comprise a fat component having a low melting point and thereby retaining liquid properties at processing temperatures. The invention further relates to a process for preparing such compositions by cold extrusion. Finally the invention relates to apparatus and the use thereof for preparing the compositions novel concerned.

BACKGROUND TO THE INVENTION

It is known to aerate a mix for the preparation of an ice cream through the use of an aerating means comprising a rotating element that fits into the barrel of a continuous ice cream freezer. This aerating means is commonly referred to as a dasher. On rotation the dasher imparts mechanical energy into the mix in order to achieve aeration and generate a fat network by aggregating some of the fat droplets. This aggregation is necessary for product stability.

For many industrial continuous freezers there are a variety of dasher types available. These can be differentiated from each other by the volume displaced within the freezer barrel which can be assessed by simply filling the freezer barrel with a liquid, such as water, and measuring the volume of liquid displaced when the dasher is fitted therein. A dasher described as a series 80 indicates that this rotating element occupies 80% of the available internal volume of the freezer barrel so that only 20% of the space is available to be occupied by the mix to be aerated. By contrast a series 15 dasher, also known in the art, demonstrates a displacement volume of only 15% of the internal barrel volume, the remaining 85% being available to be occupied by a mix to be aerated.

In conventional ice cream processing it is generally accepted that higher displacement dashers such as the series 80 give rise to high quality ice cream being highly churned (Ice Cream 5$^{th}$ Edition, W. S. Arbuckle et al., page 183) thus showing optimal levels of fat de-stabilisation, while at the same time product dryness, good meltdown resistance and product hardness. These displacement dashers are therefore the standard form of aerating means used in ice cream manufacture.

Cold extrusion of aerated compositions is also known in the art. U.S. Pat. No. 5,345,781 describes the extrusion of a pre-aerated foam through a freezing device. Pre-aeration has conventionally been undertaken through the use of an aerating means in the form of a high displacement dasher (Ice Cream 5$^{th}$ Edition, W. S. Arbuckle et al., page 184). The foam once aerated is then transferred to cold extrusion apparatus. FIG. 3 of U.S. Pat. No. 4,345,781 illustrates this approach.

Cold extrusion allows a convenient and preferred means of preparing ice cream, however this freezing route has been found by the applicants to present additional processing problems with particular formulations that contain a high ratio of liquid to solid fat at the processing temperature. The applicants when applying the conventionally combination of an aeration means with 80% displacement and cold extrusion apparatus, have observed an inability to achieve desired levels of overrun (>90%). This loss of overrun can be so severe as to give rise to phase separation and the loss of control of the process to the extent that extrusion apparatus may become blocked.

The ice cream formulations prepared by conventional aeration and cold extrusion systems comprise a fat phase with a relatively high melting point. This means that little if any liquid fat is present at the processing temperature.

The applicants have identified a need to extend the range of fats that can be applied to ice cream manufacture. In particular there is a need for the development of novel ice cream compositions which have formulations that can comprise a fat component having a lower melting point, thus imparting a higher level of liquid fat in the fat phase at the processing temperature. At the same time formulations must maintain the high degree of stable aeration and low levels of destabilised fat and overrun loss characteristic of conventional ice creams. The ability to use increasingly varied fats would also allow the manufacture of ice cream at a reduced cost.

The technical problem to be solved by the present invention therefore relates to the production of novel ice cream formulations, wherein said formulations comprise fat types that have not been conventionally applied to commercial ice cream manufacture due to high levels of liquid fat that they impart in the fat phase of a mix at the processing temperature. More particularly the problem has been found to particularly relate to enabling the cold extrusion of these so mentioned novel ice cream formulations.

It has been surprisingly been found that a solution to this problem resides in the use of equipment which has never been used for this type of formulation before. There is no suggestion in the prior art that this type of equipment has any positive influence on the destabilisation of fat, phase separation or overrun loss during the processing of a composition.

The present invention seeks to provide a stable composition with at least 90% overrun, wherein said composition comprises a fat phase which has a high ratio of liquid fat to solid fat at the processing temperature. More particularly the present invention provides aerated novel compositions of this type which are also suitable for cold extrusion.

Tests and Definitions

Levels of liquid fat can be determined by $^{13}$C-NMR spectroscopy wherein the liquid fat level of an emulsion of an ice cream mix of the invention is determined.

Measurements carried out at −5 & +50° C. for 100% fully liquid state. $^{13}$C-NMR is carried out on a Bruker AMX-400 high resolution NMR spectrometer, with 10 mm sample tubes. Data is acquired with inverse gated proton de-coupling and suitable interscan delay to ensure quantitative results. Volume of samples for 100% liquid measurement was reduced to keep total sample within probe coils and hence negate any complications due to premix separation. Measurements at −5° C. is carried out after external equilibration for at least 2 hrs. 100% liquid measurements is carried out after at least 30 min equilibration, at +50° C., in spectrometer probe. All temperatures verified using external thermocouple meter. Liquid fat content is determined by integration of fat signals (15–40 ppm), relative to integral of sugar signals (60–85 ppm). At −5° C. and above the integral of sugar signals will remain constant and hence can be used as an internal standard. The proportion of liquid fat at the chosen temperature is calculated by comparison of integrals with those from fat signals from the 100% "melted" sample.

For the purpose of the invention overrun can be determined as described in Ice Cream 4$^{th}$ Edition, Arbuckle et al., page 181.

Cold extrusion (coldex) is used to denote a cooling system wherein a material enters extrusion apparatus a temperature which is somewhat higher than that at the point of extrusion. Typically in the cold extrusion of ice cream material enters the extrusion apparatus at about −13° C. and subsequently about −18° C. at the point of extrusion.

BRIEF DESCRIPTION OF THE INVENTION

It is a first object of the present invention to provide a cold extruded composition comprising a fat phase and having an overrun of at least 90%, characterised in that at least 45% weight by weight of the fat phase is liquid at −5° C.

In a preferred embodiment the cold extruded composition of the invention is an ice cream.

In the light of conventional teachings that an aerating means that displaces 80% of freezer barrel volume is most suited to giving the best quality ice cream in terms of optimal fat de-emulsification, product dryness, good meltdown resistance and product hardness; it is unexpected to find that the novel compositions of the invention cannot be processed to an ice cream of acceptable quality by this route.

It has been found that the use of cold extrusion apparatus leads to an increase in destabilised fat levels in the high liquid fat compositions of the invention. This is due to the temperature of extrusion and the increased shear stress imposed on the ice cream. Similarly a high displacement aerating means will also lead to unacceptable high levels of destabilised fat in those formulations of the invention due to the reduced residence time of the mix in the freezer barrel. The combined effect of this phenomenon occurring at both stages of processing has been found to make it impossible to prepare ice cream compositions with liquid fat levels in excess of 45% w/w of the fat phase by using the combination of a high displacement aerating means and cold extrusion apparatus.

The presently proposed solution to this newly identified problem is to provide for the aeration of a composition as described above with a aerating means which displaces less than 40% of a freezer barrel internal volume prior to entry of said mix into cold extrusion apparatus.

It is a second object of the present invention to provide a process for the preparation of a cold extruded composition, wherein said process comprises;

(i) aerating a mix comprising a fat phase in a freezer barrel enclosing an internal volume, said internal volume comprising an aeration means;

(ii) extruding the mix through a cold extruding means;
characterised in that, said aeration means displaces less than 40% of said internal volume and at least 45% weight by weight of the fat phase is liquid at −5° C.

By way of the present invention a process has been devised as described above wherein a selected displacement range for the aerating means of less than 40% of the internal freezer barrel volume, has been found to yield a stable aerated ice cream demonstrating good properties. These properties include low fat de-emulsification, product dryness, good meltdown resistance and product hardness for the novel compositions provided herein.

Through the use of an aerating means that displaces less than 40% of internal freezer barrel volume it has been possible to achieve aeration levels in excess of 90% overrun for a mix having at least 45% w/w of its fat phase in a liquid state at −5° C. In a preferred embodiment, the invention therefore comprises a process for the preparation of a cold extruded composition as disclosed above wherein said mix is aerated to an overrun of at least 90%.

It is preferred that the aerating means used for the purpose of the invention displaces at least 10% of the internal barrel volume, more preferably at least 15%, most preferably the aerating means displaces from 15 to 30% of the internal freezer barrel volume. Suitable aeration means are commercially available from the manufacturer WCB.

It is recognised that as the proportion of liquid fat in the fat phase increases it becomes more preferable to choose a aerating means towards the lower end of the displacement range specified above. This increases the residence time of the mix in the freezer barrel and thereby allows a longer and more effective aeration period without destabilisation of the fat.

A composition of the invention may comprise one or more fat components derived from any fat source having a low melting point, wherein the addition of said component(s) results in a proportion of at least 45% w/w liquid fat in the fat phase of the product at −5° C. Preferably the fat phase comprises one or more fats selected from the group comprising soy bean oil, palm oil, walnut oil, pistachio oil, hazelnut oil, hydrogenated or partially hydrogenated sunflower oil.

For a cold extruded ice cream according to the invention it is preferable that the proportion of the fat phase being liquid at −5° C. is less than 55% w/w of the phase. A mix comprising a fat phase with a liquid fat in the range 45 to 55% w/w can therefore be suitably processed by the invention, most preferably 47 to 53% w/w of the fat phase is liquid at −5° C.

The total fat content may range from 3% w/w to 15% w/w of the composition, preferably 5 to 10% w/w. Most preferred fat content of a composition according to the invention is about 8% w/w of the composition.

Preferably compositions of the invention have an overrun of at least 100%, more preferably the level of overrun is at least 110%.

It is a third object of the invention to provide an apparatus comprising a freezer barrel enclosing an internal volume comprising an aerating means, said freezer barrel further comprising an outflow means allowing passage of aerated material to a cold extruder, characterised in that said aerating means displaces less than 40% of the internal volume of said freezer barrel. Preferably the outflow means is continuous with the cold extruder.

The cold extrusion apparatus used in the process of the invention may comprise either a single or twin screw extruder. Preferably the extruder is the single screw type.

A fourth object of the invention provides for the use of the apparatus as described above in the preparation of a cold extruded ice cream, wherein preferably said ice cream has a formulation in accordance with the invention.

DETAILED DESCRIPTION

EXAMPLE 500 kg of an ice cream mix A was prepared with the composition indicated in table 1. The mix was made in a large scale mix plant at a temperature of approximately 65–70° C., wherein the order of ingredients into the tank was water, skimmed milk powder, sugars and stabilisers/emulsifier compounds (suitably Cremodan™ SE 019 available from Danisco™ ingredients) and fats/oils. MD40 is a refined and spray dried glucose syrup in powder form having 40% dextrose equivalent and is sold as Cerestar™ or Morsweet™. The mix was homogenised at $1.379 \times 10^7$ Nm$^{-2}$– 138 Bar (2000 psi) and then pasteurised at 83° C. for 15 seconds. Following pasteurisation the mixture was immediately chilled to approximately 4° C. and aged in a ageing tank for at least 2 hours.

According to the methodology described above the level of liquid fat at the processing temperature of −5° C. was 53% w/w of the fat phase in the product.

TABLE 1

Mix A

| Ingredient | Parts by weight |
| --- | --- |
| Sucrose | 13.61 |
| Walnut oil | 2.86 |
| Skimmed milk powder | 10.08 |
| MD40 | 4.05 |
| Butter fat | 5.14 |
| Cremodan SE 019 | 0.45 |
| Water | 63.81 |

Mixes prepared as described and according to the above formulation were separately processed through freezer barrels comprising an aerating means of 15, 30 and 80% displacement of the internal volume of the barrel.

The aerated material from the freezer barrel was then passed through a conventional single screw extruder (SSE). Inlet pressure to the SSE was maintained constant at $7 \times 10^5$ Nm$^{-2}$ (7 bar) and the aerated composition in the SSE remained at a temperature between −12 and −15° C.

The effect of varying the displacement of the aerating means on the extruded product was assessed, wherein it was observed that an aerating means of 15 or 30% displacement it was possible to achieve a cold extruded product having an overrun of at least 90% wherein said product demonstrated good organoleptic properties showing a creamy texture with little or no ice and no phase separation or unacceptable level of fat destabilisation.

In contrast where an aerating means having a displacement of 80% was used with this formulation the extruded product showed destabilisation of fat, phase separation and overrun loss. This product was highly inferior to that obtained with an aerating means of 15 or 30% displacement.

What is claimed is:

1. A cold extruded composition comprising a fat phase and having and overrun of at least 90%, characterised in that at least 45% w/w of the fat phase is liquid at −5° C.

2. A composition according to claim 1 wherein said composition is an ice cream.

3. A process for the preparation of a cold extruded composition, wherein said process comprises;

(i) aerating a mix comprising a fat phase in a freezer barrel enclosing an internal volume, said internal volume comprising an aeration means;

(ii) extruding the mix through a cold extruding means; characterised in that, said aeration means displaces less than 40% of said internal volume and at least 45% w/w of the fat phase is liquid at −5° C.

4. A process according to claim 3, wherein said mix is aerated to an overrun of at least 90%.

5. A process according to either claim 3 wherein said compositin is an ice cream.

* * * * *